US012263674B2

(12) United States Patent
Yoshimune et al.

(10) Patent No.: US 12,263,674 B2
(45) Date of Patent: Apr. 1, 2025

(54) IMAGE FORMING APPARATUS AND METHOD TO DETERMINE CUTTING STATE OF SHEET MEDIUM

(71) Applicant: BROTHER KOGYO KABUSHIKI KAISHA, Nagoya (JP)

(72) Inventors: Hideaki Yoshimune, Nagoya (JP); Masatomo Yamaguchi, Inazawa (JP); Yuya Tatematsu, Nagoya (JP); Takashi Suzuki, Toyota (JP); Yuto Chiba, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 85 days.

(21) Appl. No.: 18/064,354

(22) Filed: Dec. 12, 2022

(65) Prior Publication Data

US 2023/0191809 A1 Jun. 22, 2023

(30) Foreign Application Priority Data

Dec. 17, 2021 (JP) ................................ 2021-205308

(51) Int. Cl.
*B41J 11/66* (2006.01)
*B41J 11/70* (2006.01)
*B41J 29/20* (2006.01)

(52) U.S. Cl.
CPC .............. *B41J 11/663* (2013.01); *B41J 11/70* (2013.01); *B41J 29/20* (2013.01)

(58) Field of Classification Search
CPC ......... B41J 11/663; B41J 11/70; B41J 11/706; B41J 29/20; B41J 15/04; B41J 29/393
See application file for complete search history.

(56) References Cited

U.S. PATENT DOCUMENTS

2021/0237489 A1* 8/2021 Nakamura ............ B41J 11/703

FOREIGN PATENT DOCUMENTS

JP 2005007592 A 1/2005

* cited by examiner

*Primary Examiner* — Kristal Feggins
(74) *Attorney, Agent, or Firm* — Scully, Scott, Murphy & Presser, P.C.

(57) ABSTRACT

An image forming apparatus includes a conveyor to convey a sheet medium, a print engine to form an image on the sheet medium, a cutter to cut the sheet medium, a signal output device, and a controller. The cutter includes a first blade, a second blade, and a moving device to move at least one of the first and second blades. The controller receives, from the signal output device, a signal indicating a variation over time in a value correlated with a moving load for the at least one blade, and determines, based on the received signal, which state the sheet medium is in among a plurality of states including a first state where the sheet medium is cut normally, a second state where there is an abnormality in cutting the sheet medium, and a third state where there is a different abnormality in cutting the sheet medium.

18 Claims, 11 Drawing Sheets

IMAGE FORMING APPARATUS AND METHOD TO DETERMINE CUTTING STATE OF SHEET MEDIUM

REFERENCE TO RELATED APPLICATIONS

This application claims priority from Japanese Patent Application No. 2021-205308 filed on Dec. 17, 2021. The entire content of the priority application is incorporated herein by reference.

BACKGROUND ART

A technology has been known in which it is determined whether there exists a recording sheet (i.e., a sheet medium) between a movable blade and a fixed blade, by detecting a fluctuation in an electric current applied to a cutter motor for moving the movable blade when the recording sheet is cut by moving the movable blade relative to the fixed blade. In the technology, when it is determined that the recording sheet does not exist between the movable blade and the fixed blade, it is determined that the recording sheet is unable to be fed to a position between the two blades and that a sheet jam is occurring.

DESCRIPTION

In the known technology, it is possible to determine whether a sheet jam is occurring. However, it is impossible to determine whether the recording sheet has been cut normally, and further to determine, if the recording sheet has not been cut normally, what state the recording sheet is in. Therefore, the following problem may be caused. That is, the recording sheet may be discharged as is, even when the recording sheet has, in practice, been cut inadequately (e.g., only partially cut, or wrinkled due to the recording sheet being chewed during the cutting of the recording sheet) although it is determined that the recording sheet has existed between the two blades and has been cut by the two blades.

Aspects of the present disclosure are advantageous to provide one or more improved techniques that make it possible to determine which state a sheet medium is in among a first state where the sheet medium has been cut normally, a second state where there is an abnormality occurring in cutting the sheet medium, and a third state where there is an abnormality, different from the second state, occurring in cutting the sheet medium.

According to aspects of the present disclosure, an image forming apparatus is provided, which includes a conveyor, a print engine, a cutter, a signal output device, and a controller. The conveyor is configured to convey a sheet medium in a conveyance direction. The print engine is configured to form an image on the sheet medium conveyed by the conveyor. The cutter includes a first blade, a second blade, and a moving device. The first blade is configured to come into contact with a first surface of the sheet medium conveyed by the conveyor. The second blade is configured to come into contact with a second surface opposite to the first surface, of the sheet medium. The moving device is configured to move at least one blade, selected from the first blade and the second blade, along an intersecting direction with the conveyance direction. The cutter is configured to cut the sheet medium along the intersecting direction by the first blade and the second blade collaborating with each other. The signal output device is configured to output a signal indicating a variation over time in a value correlated with a moving load for the at least one blade in cutting the sheet medium by the cutter. The controller is configured to, based on the signal output from the signal output device during the cutting of the sheet medium, determine which state the sheet medium is in among a plurality of states. The plurality of states include a first state where the sheet medium is cut normally, a second state where there is an abnormality occurring in cutting the sheet medium, and a third state where there is an abnormality, different from the second state, occurring in cutting the sheet medium.

According to aspects of the present disclosure, further provided is a method implementable on a controller of an image forming apparatus configured to cut a sheet medium by moving at least one blade of a cutter. The method includes receiving, from a signal output device, a signal indicating a variation over time in a value correlated with a moving load for the at least one blade in cutting the sheet medium. The method further includes determining, based on the signal output from the signal output device during the cutting of the sheet medium, which state the sheet medium is in among a plurality of states. The plurality of states include a first state where the sheet medium is cut normally, a second state where there is an abnormality occurring in cutting the sheet medium, and a third state where there is an abnormality, different from the second state, occurring in cutting the sheet medium. The image forming apparatus includes a conveyor, a print engine, the cutter, the signal output device, and the controller. The conveyor is configured to convey the sheet medium in a conveyance direction. The print engine is configured to form an image on the sheet medium conveyed by the conveyor. The cutter includes a first blade, a second blade, and a moving device. The first blade is configured to come into contact with a first surface of the sheet medium conveyed by the conveyor. The second blade is configured to come into contact with a second surface opposite to the first surface, of the sheet medium. The moving device is configured to move the at least one blade, selected from the first blade and the second blade, along an intersecting direction with the conveyance direction. The cutter is configured to cut the sheet medium along the intersecting direction by moving the at least one blade by the first blade and the second blade collaborating with each other.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, a printer 1 of an illustrative embodiment according to aspects of the present disclosure will be described with reference to the accompanying drawings. In the following description, a vertical direction is defined on the basis of a state (see FIG. 1) in which the printer 1 is installed ready for use. Further, in this state, a front-to-rear direction is defined with a front side as a side at which an opening 13 of a housing 11 is formed and a rear side as a side at which an opening 14 of the housing 11 is formed. Moreover, in this state, a left-to-right direction is defined as viewed from the front side of the printer 1. It is noted that hereinafter, each of the above directions may represent two mutually-opposite directions along each individual direction. Specifically, for instance, the vertical direction may represent both the upward direction and the downward direction that are along the vertical direction. Further, the front-to-rear direction may represent both the frontward direction and the rearward direction that are along the front-to-rear direction. Moreover, the left-to-right direction may represent both the leftward direction and the rightward direction that are along the left-to-right direction.

Figure 1:
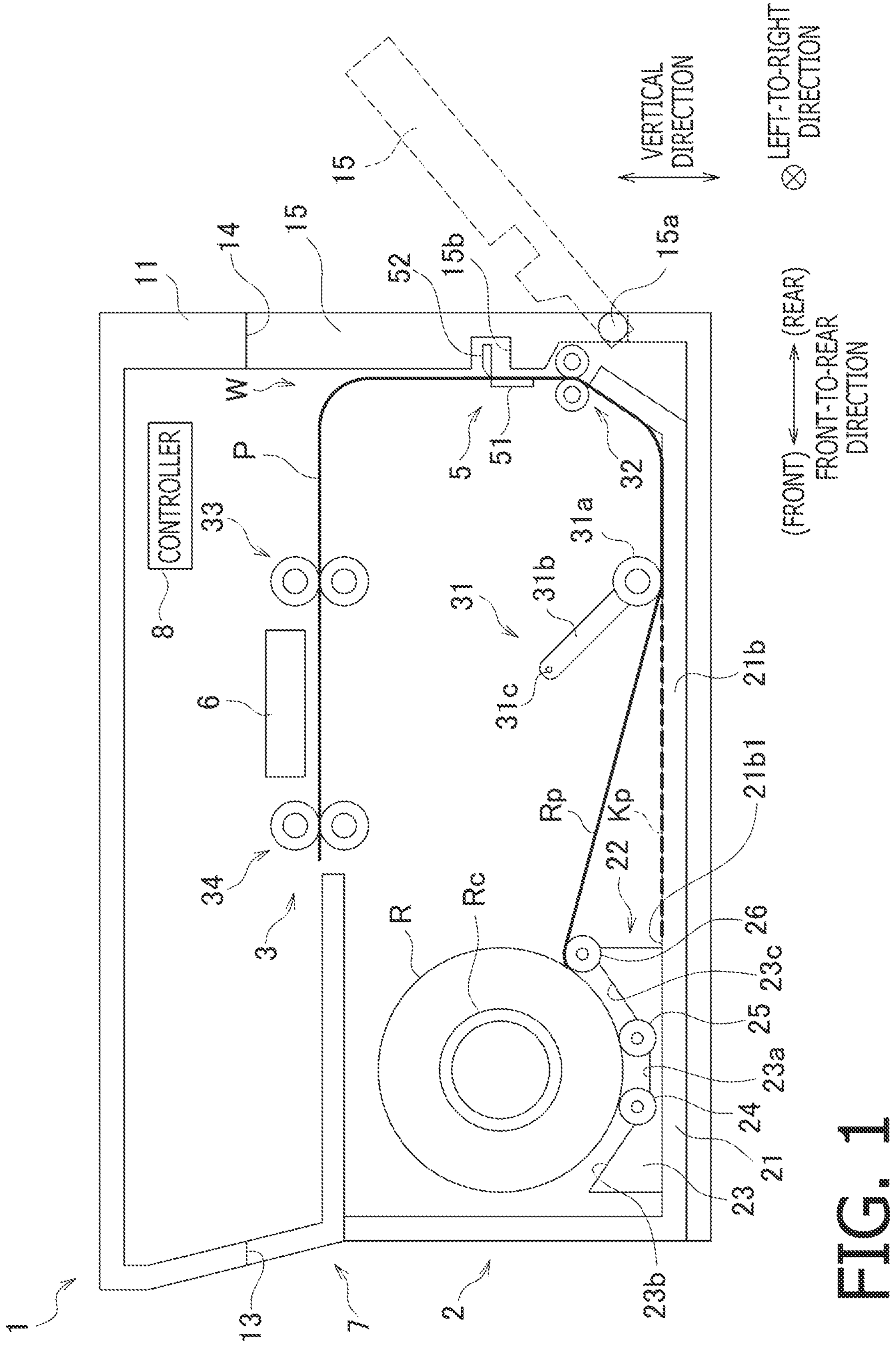
FIG. 1 is a cross-sectional side view schematically showing a configuration of a printer.
Figure 2:
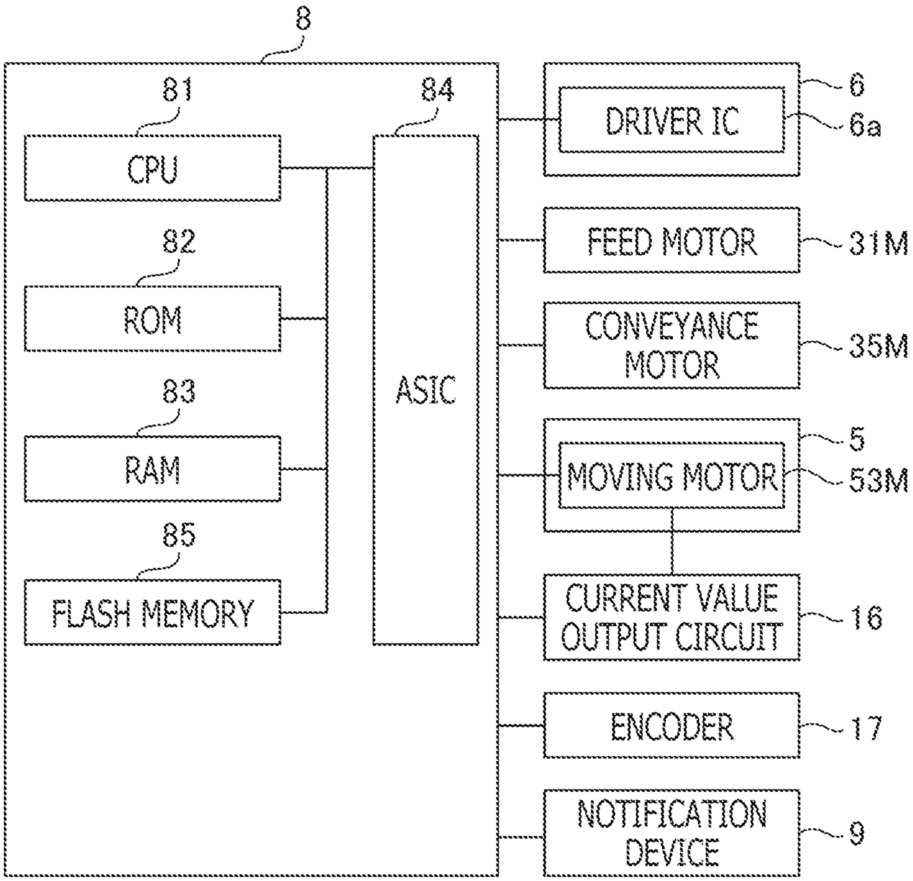
FIG. 2 is a block diagram showing a control configuration of the printer.

As shown in FIGS. 1 and 2, the printer 1 includes a feed cassette 2, a conveyor 3, a cutter 5, a head 6, a discharge tray 7, a controller 8, a notification device 9 (see FIG. 2), the housing 11, a cover 15, a current value output circuit 16 (see FIG. 2) and an encoder 17 (see FIG. 2).

The feed cassette 2 is disposed below the head 6 in the housing 11. The discharge tray 7 is disposed in front of the head 6 and above the feed cassette 2 in the housing 11. The feed cassette 2 and the discharge tray 7 are configured to be inserted along the front-to-rear direction into the housing 11 through the opening 13 formed in a front surface of the housing 11. In addition, the feed cassette 2 attached to the housing 11 is removable along the front-to-rear direction through the opening 13. Moreover, the discharge tray 7 attached to the housing 11 is drawable forward through the opening 13.

The feed cassette 2 is configured to selectively hold therein either a roll body R or cut paper Kp, in such a manner that one (hereinafter, which may be referred to as "sheet P") of the roll body R and the cut paper Kp is selectively fed out of the feed cassette 2. The roll body R is a long sheet of roll paper (i.e., a sheet medium) Rp wound in a roll shape around an outer circumference of a cylindrical winding core (e.g., a paper tube) Rc. As shown in FIG. 1, the feed cassette 2 includes a tray 21 and a supporter 22. The tray 21 is formed in an upward-open box shape. The supporter 22 is configured to rotatably support the roll body R while supporting the outer circumference of the roll body R from underneath. The cut paper Kp is placed on a rear portion of a bottom surface **21*b*1 of the tray 21 that is located rearward of the supporter 22, or on the entire bottom surface 21*b*1 with the supporter 22** removed therefrom. In the following description, the roll paper Rp unwound from the roll body R and the cut paper Kp may be collectively referred to as the "sheet P" without distinguishing them from each other.

The supporter 22 includes a supporting stand 23 and three rollers 24-26. The roll body R is supported by the supporter 22 in such a posture that an axial direction of the roll body R is parallel to the left-to-right direction (i.e., a direction perpendicular to a plane on which FIG. 1 is drawn). The supporting stand 23 is removably attached to a bottom section **21*b* of the tray 21. The supporting stand 23 extends along the left-to-right direction. Each of the rollers 24-26 is rotatably supported by the supporting stand 23 in such a posture that an axial direction of each roller 24-26** is parallel to the left-to-right direction.

The supporting stand 23 has a horizontal surface **23*a* and two inclined surfaces 23*b* and 23*c*. The inclined surfaces 23*b* and 23*c* are positioned to sandwich the horizontal surface 23*a* therebetween in the front-to-rear direction. The roller 24 is disposed on a rear portion of the inclined surface 23*b* and is positioned forward of the roller 25. The roller 25 is disposed on a front portion of the inclined surface 23*c*. The roller 26 is disposed on a rear portion of the inclined surface 23*c*. The rollers 24 and 25** are configured to support the roll body R from below in contact with the outer circumference of a lower portion of the roll body R.

The cover 15 is positioned to cover the opening 14 formed in the rear surface of the housing 11. A lower end portion of the cover 15 is rotatably supported by a shaft **15*a*. The shaft 15*a* is supported by the housing 11. The shaft 15*a* extends along the left-to-right direction (i.e., the direction perpendicular to the plane on which FIG. 1 is drawn). The cover 15 is configured to rotate around the shaft 15*a*, thereby moving between a closed position (shown by a solid line in FIG. 1) and an open position (shown by a dashed line in FIG. 1). When in the closed position, the cover 15 forms a conveyance path W along which the sheet P is conveyed by the conveyor 3, between the cover 15 and a guide (not shown) provided in the housing 11. When the cover 15** is in the open position, a part of the conveyance path W is opened.

The conveyor 3 includes a feeder 31, three conveyance roller pairs 32 to 34, and a conveyance motor 35M (see FIG. 2). The conveyor 31 is configured to feed the sheet P (i.e., one of the roll body R and the cut paper Kp) placed in the feed cassette 2, rearward out of the feed cassette 2.

The feeder 31 is disposed above the feed cassette 2. The feeder 31 includes a pick-up roller **31*a*, an arm 31*b*, and a feed motor 31M (see FIG. 2). The pick-up roller 31***a* is pivotally supported by an end portion of the arm 31*b*. The arm 31*b* is rotatably supported by a spindle 31*c*. The arm 31*b* is urged, for instance, by a spring, in such a direction that the pick-up roller 31*a* comes into contact with the bottom surface 21*b*1 of the tray 21. The arm 31*b* is configured to retract upward on an occasion of attaching or detaching the tray 21. The pick-up roller 31*a* is configured to rotate by a driving force transmitted from the feed motor 31M. When the feed motor 31M is driven by the controller 8, the pick-up roller 31*a* rotates, thereby feeding the sheet P placed in the tray 21 rearward.

The three conveyance roller pairs 32 to 34 are configured to convey the sheet P fed by the feeder 31 along a conveyance direction orthogonal to the left-to-right direction, in the housing 11. The three conveyance roller pairs 32-34 are arranged in the aforementioned order from an upstream side in the conveyance direction. The conveyance roller pair 32 is configured to convey the sheet P which has been fed from the feed cassette 2 by the feeder 31. By the conveyance roller pair 32, the sheet P is first conveyed upward with one surface thereof facing rearward and the other surface facing frontward. Then, the sheet P is conveyed forward after passing through the cutter 5. The conveyance roller pair 33 receives the sheet P conveyed by conveyance roller pair 32 and then conveys the sheet P toward the head 6. The conveyance roller pair 34 receives the sheet P conveyed by the conveyance roller pair 33 and then discharges the sheet P. The conveyance roller pairs 33 and 34 convey the sheet P forward.

Each of the conveyance roller pairs 32-34 includes a driving roller and a driven roller. The driving roller is configured to rotate by a driving force transmitted from the conveyance motor 35M. The driven roller is configured to rotate according to the rotation of the driving roller. When the conveyance motor 35M is driven by the controller 8, the driving roller and the driven roller of each conveyance roller pair 32-34 rotate while nipping the sheet P therebetween, thereby conveying the sheet P in the conveyance direction.

As shown in FIG. 1, the cutter 5 is disposed between the conveyance roller pairs 32 and 33 in the conveyance direction and above the conveyance roller pair 32. The cutter 5 includes a fixed blade 51, a rotary blade 52, and a moving mechanism 53 (see FIGS. 4A-4C). The cutter 5 is configured to cut the roll paper Rp passing along a path Wx (i.e., a part of the conveyance path W, see FIG. 3) by fixed blade 51 and the rotary blade 52 collaborating with each other.

Figure 3:
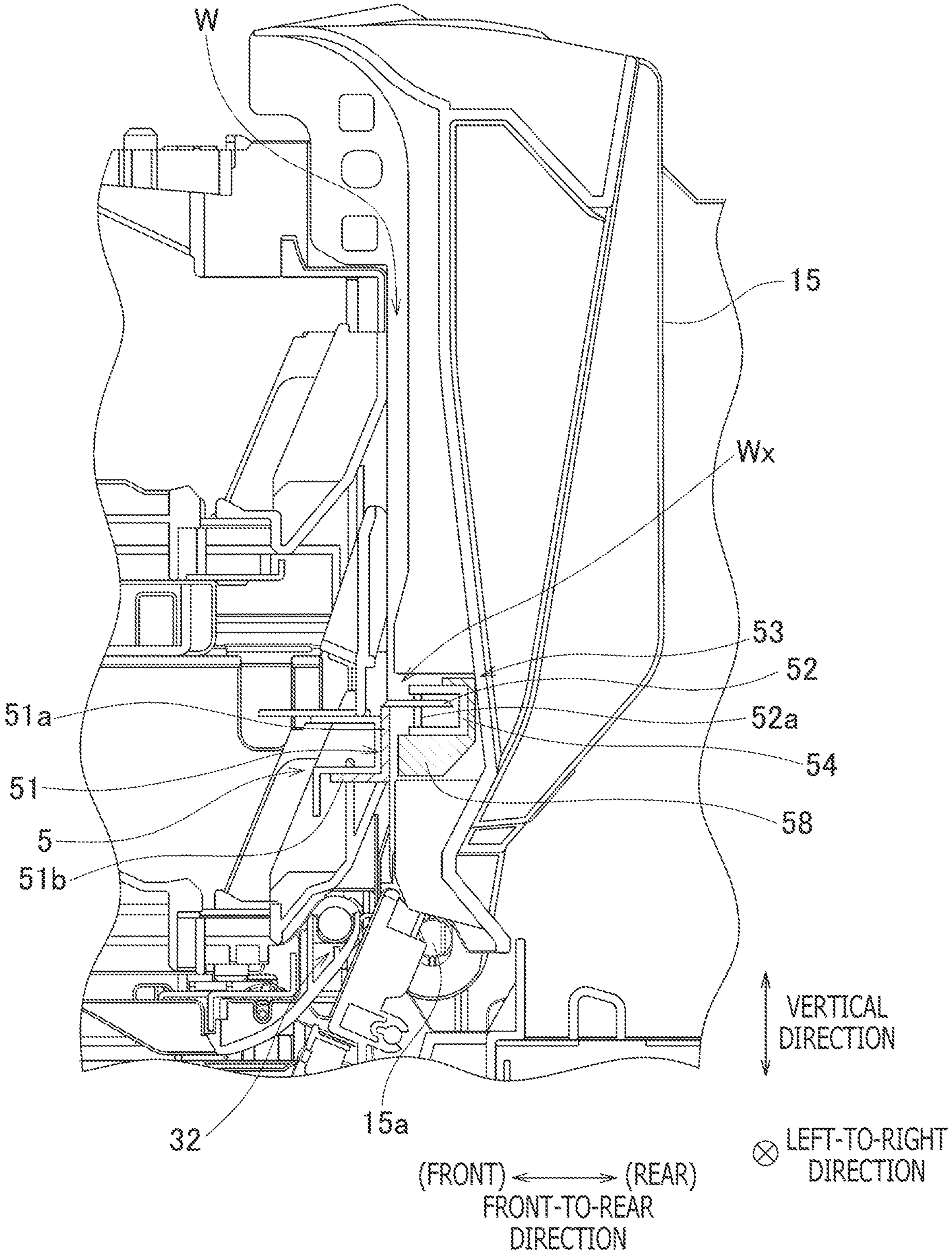
FIG. 3 is a cross-sectional side view showing detailed configurations of a cover and a cutter of the printer.
Figure 4A:
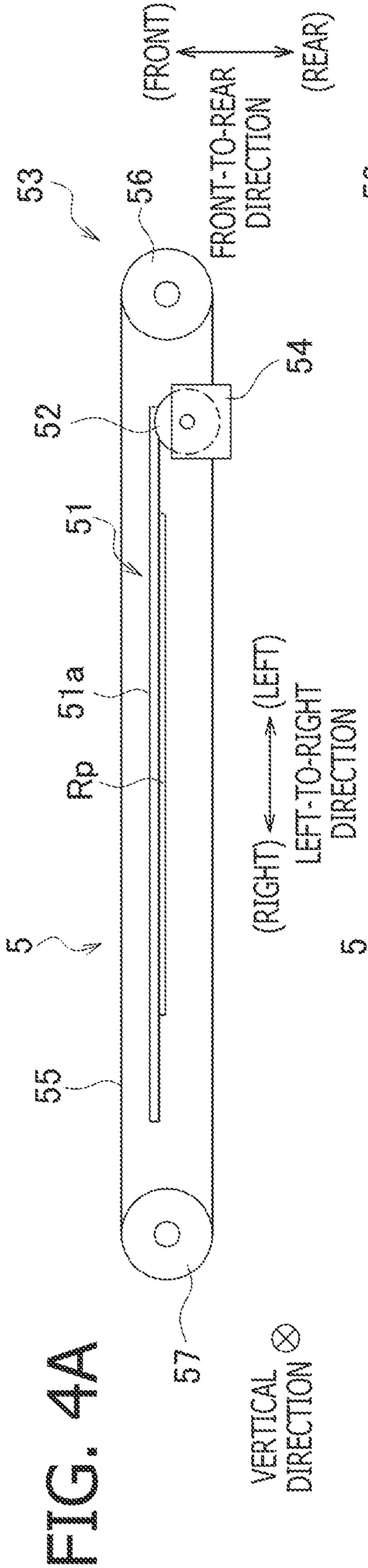
FIG. 4A is a plan view schematically showing the cutter with a rotary blade and a carriage placed in a standby position.
Figure 4B:
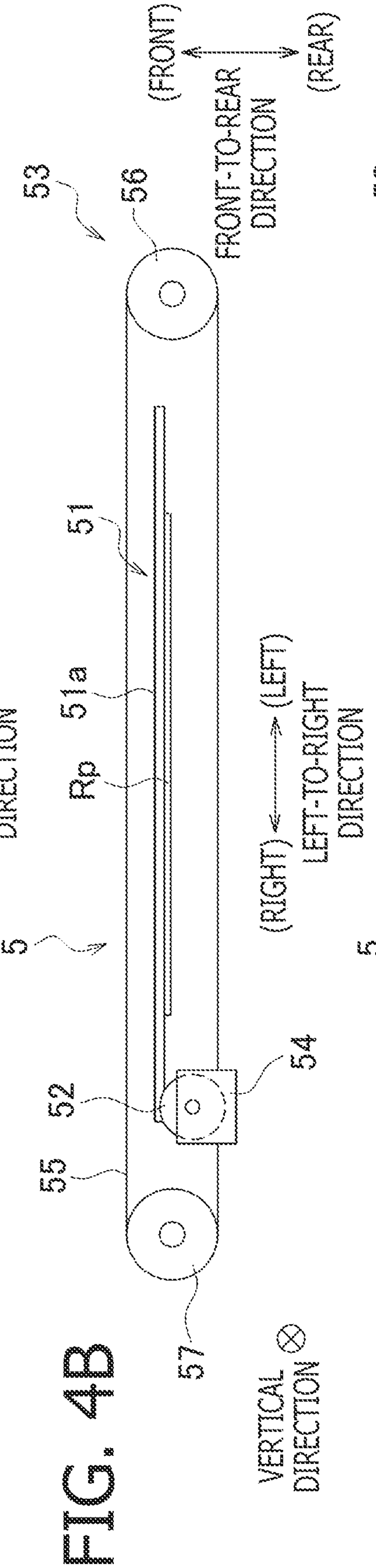
FIG. 4B is a plan view schematically showing the cutter with the rotary blade and the carriage placed in a stop position.
Figure 4C:
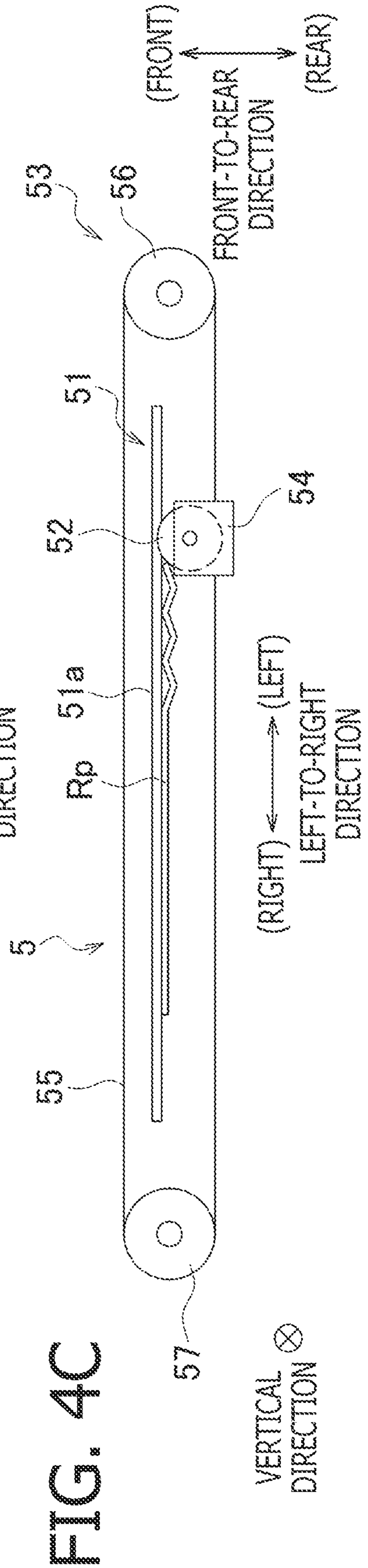
FIG. 4C is a plan view schematically showing a situation where a second abnormal state has occurred when the cutter is cutting roll paper.

As shown in FIG. 3, the fixed blade 51 includes a vertical section 51*a* and a horizontal section 51*b*, and has an L-shaped cross-sectional shape. The fixed blade 51 is fixed to the housing 11. The vertical section 51*a* is erected upward from a rear end of the horizontal section 51*b*. As shown in FIGS. 4A-4C, the fixed blade 51 extends long along the left-to-right direction. More specifically, in FIGS. 4A-4C, the fixed blade 51 is formed longer than a width of the roll paper Rp in the left-to-right direction (i.e., a direction perpendicular to the conveyance direction). The vertical section 51*a* of the fixed blade 51 is disposed to be contactable with a forward-facing surface of the roll paper Rp passing along the path Wx.

When the cover 15 is in the closed position (i.e., the position indicated by the solid line in FIG. 1), the rotary blade 52 is positioned in a groove 15*b* formed on a forward-facing surface of the cover 15. The rotary blade 52 is mounted on an after-mentioned carriage 54 (see FIGS. 4A-4C) that is movable along the left-to-right directions. As shown in FIG. 3, the rotary blade 52 is a disk-shaped blade, and is supported by the carriage 54 to be rotatable around so that it can rotate around a shaft 52*a* extending in the vertical direction. The rotary blade 52 is disposed to be contactable with a rearward-facing surface of the roll paper Rp passing along the path Wx. Moreover, as shown in FIG. 3, the rotary blade 52 is disposed in such a manner that a front end thereof is contactable with an upper end surface of the vertical section 51 of the fixed blade 51.

As shown in FIGS. 4A-4C, the moving mechanism 53 includes the carriage 54, a belt 55, two pulleys 56 and 57, a guide rail 58 (see FIG. 3), and a moving motor 53M (see FIG. 2). As shown in FIG. 3, the guide rail 58 is disposed in its entirety in the groove 15*b* of the cover 15 which is in the closed position B. The guide rail 58 is formed to extend long along the left-to-right direction. The guide rail 58 is configured to support the carriage 54 to be movable along the left-to-right direction.

As shown in FIGS. 4A-4C, the carriage 54 rotatably supports the rotary blade 52. The carriage 54 is fixed to the belt 55. The two pulleys 56 and 57 are spaced apart from each other to sandwich the path Wx therebetween in the left-to-right direction. The pulley 56 is a driving pulley to which a rotational force is applied by the moving motor 53M. The belt 55 is an endless annular belt wound around the two pulleys 56 and 57. The pulley 57 is a driven pulley to be rotated by the belt 55 traveling according to the rotation of pulley 56.

As shown in FIG. 4A, the carriage 54 is normally located in a standby position corresponding to a left end portion of the fixed blade 51. At this time, the rotary blade 52 is located as well in the standby position. Then, to cut the roll paper Rp, the controller 8 controls the moving motor 53M to make a forward rotation, thereby causing the belt 55 to travel and moving the rotary blade 52 rightward together with the carriage 54. At this time, the rotary blade 52 rotates due to friction with the fixed blade 51. Thereby, the roll paper Rp on the path Wx is cut along a width direction (i.e., a direction perpendicular to the conveyance direction) by the fixed blade 51 and the rotary blade 52 collaborating with each other. Thus, a trailing end of the roll paper Rp is formed. As shown in FIG. 4B, the carriage 54 and the rotary blade 52 are moved rightward, and then stopped at a stop position corresponding to a right end portion of the fixed blade 51 in response to the stop of the moving motor 53M. Thereafter, when the moving motor 53M is driven to make a reverse rotation, the rotary blade 52 moves leftward together with the carriage 54. Thus, the rotary blade 52 is brought back to the standby position shown in FIG. 4A.

A current value output circuit 16 is connected with the moving motor 53M. The current value output circuit 16 is configured to output a signal indicating the magnitude (i.e., the current value of an electric current applied to the moving motor 53M) of a load on the moving motor 53M in moving the rotary blade 52 in the left-to-right direction. Hereinafter, the "load on the moving motor 53M in moving the rotary blade 52 in the left-to-right direction" may be referred to as the "moving load for the rotary blade 52." Further, an encoder 17 is disposed at a transmitting section of a transmission mechanism (not shown) configured to transmit the rotational force applied by the moving motor 53M to the pulley 56. The encoder 17 is configured to output a signal that indicates a position and a moving speed of the rotary blade 52 moving from the standby position in response to the rotation of the moving motor 53M. For instance, in the illustrative embodiment, a rotary encoder is employed as the encoder 17. In another instance, however, a linear encoder may be employed.

Figure 5A:
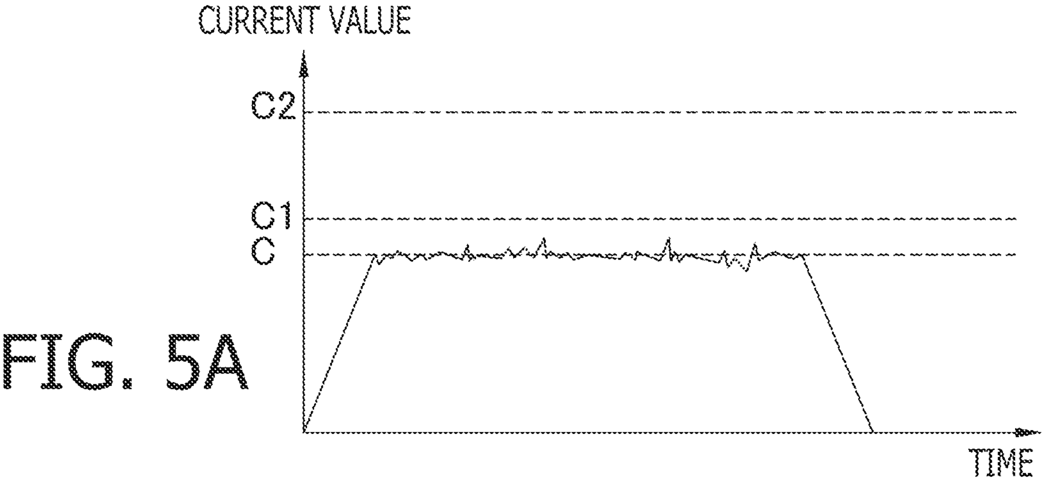
FIG. 5A shows a variation in a current value over time in a situation where a normal cutting state is maintained when the cutter is cutting the roll paper.
Figure 6A:
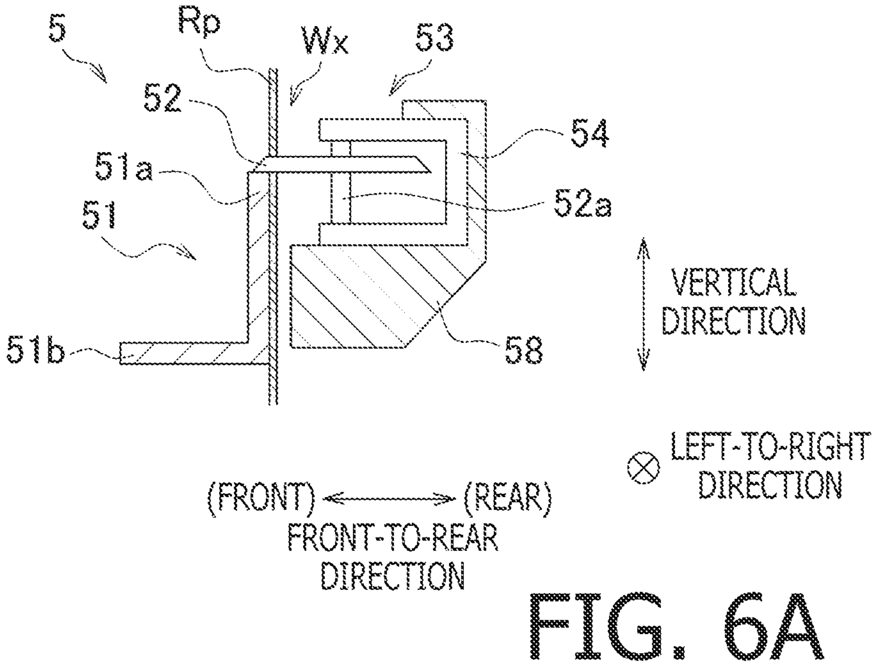
FIG. 6A is a cross-sectional side view showing a situation where the roll paper is being cut normally.

When the rotary blade 52 is moved from the standby position to the stop position, and the roll paper Rp is cut normally, the current value output circuit 16 outputs a signal indicating a current value which varies as shown in FIG. 5A. More specifically, the current value rises during a period of time from when the carriage 54 has started moving rightward from the standby position while accelerated until when the moving speed of the carriage 54 reaches a particular speed. Then, when the carriage 54 moves substantially at the constant speed after the moving speed of the carriage 54 has reached the particular speed, the current value remains around a particular value C (e.g., 0.6 A). When the carriage 54 is moving at the constant speed, the roll paper Rp comes into contact with the rotary blade 52 and is cut from one end of the roll paper RP to the other end in the left-to-right direction by the fixed blade 51 and the rotary blade 52 collaborating with each other. In a normal cutting state where the roll paper Rp is normally cut by the fixed blade 51 and the rotary blade 52, the current value remains lower than a first threshold C1. When the roll paper Rp is normally cut, the roll paper Rp is cut by the rotary blade 52 in a state where the roll paper Rp is placed linearly along the vertical direction as shown in FIG. 6A. In the illustrative embodiment, the first threshold C1 is set to 110% of the particular value C. However, the first threshold C1 may be changed as appropriate as long as the first threshold C1 is set higher than the particular value C. Then, when the rotary blade 52 has passed through the other end of the roll paper Rp in the left-to-right direction, the carriage 54 is decelerated, and the current value falls during a period of time until the carriage 54 stops.

Figure 5B:
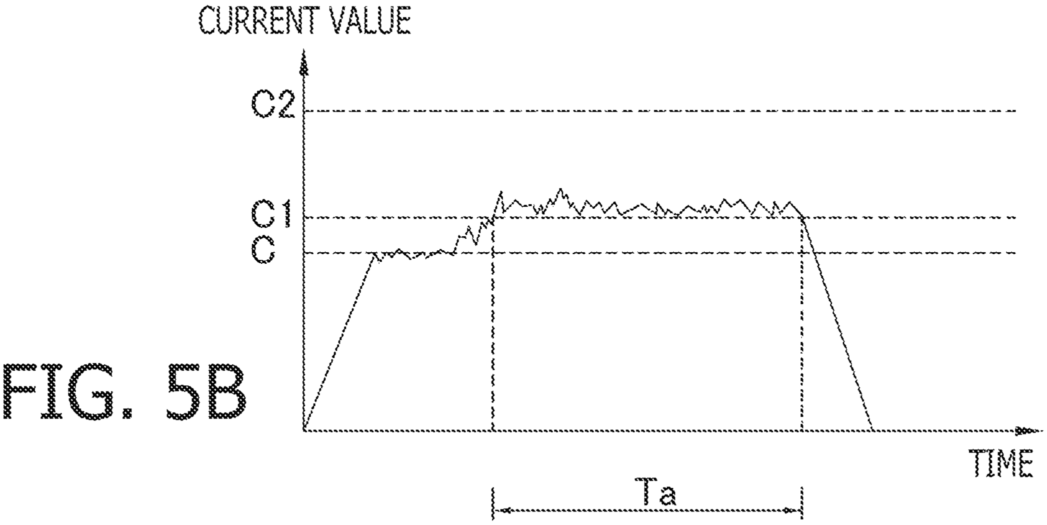
FIG. 5B shows a variation in the current value over time in a situation where a first abnormal state has occurred when the cutter is cutting the roll paper.
Figure 6B:
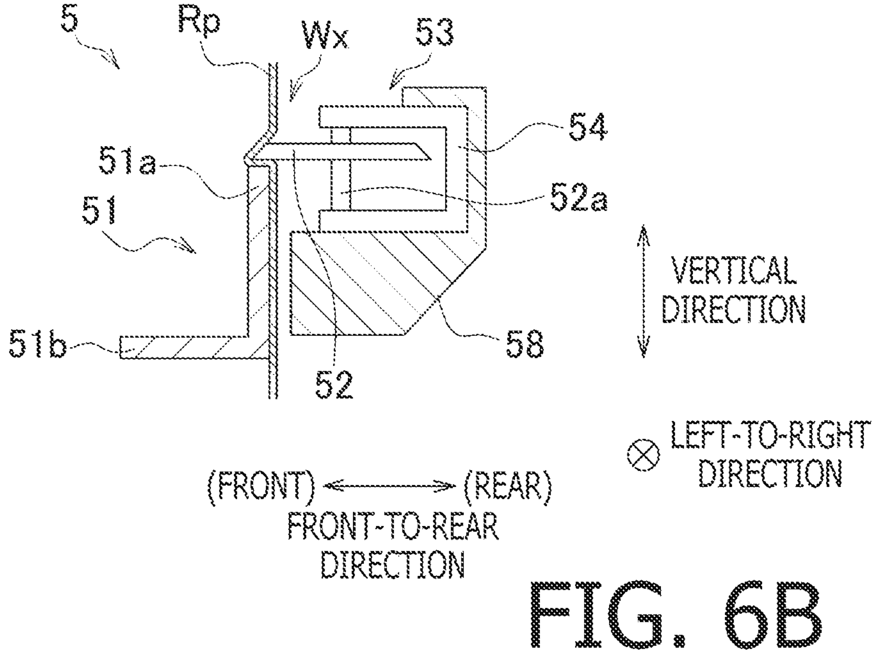
FIG. 6B is a cross-sectional side view showing the first abnormal state where there is an abnormality occurring in cutting the roll paper.

On the other hand, there may be a case in which during a period of time from when the rotary blade 52 has passed through the one end of the roll paper Rp until when the rotary blade 52 passes through the other end of the roll paper Rp, the roll paper Rp is not cut by the fixed blade 51 and the rotary blade 52 due to some causes such as deterioration in the paper quality and/or the blades 51 and 52. In this case, for instance, as shown in FIG. 6B, the roll paper Rp may be stuck between the fixed blade 51 and the rotary blade 52, thereby resulting in a first abnormal state where there is an abnormality occurring in cutting the roll paper Rp. When the first abnormal state is occurring, as shown in FIG. 5B, a period Ta arises during which the current value is higher than the first threshold C1 and is equal to or lower than a second threshold C2. In the illustrative embodiment, the second threshold C2 is set to 150% of the particular value C1. However, the second threshold C2 may be changed as appropriate as long as the second threshold C22 is set higher than the first threshold C1.

Figure 5C:
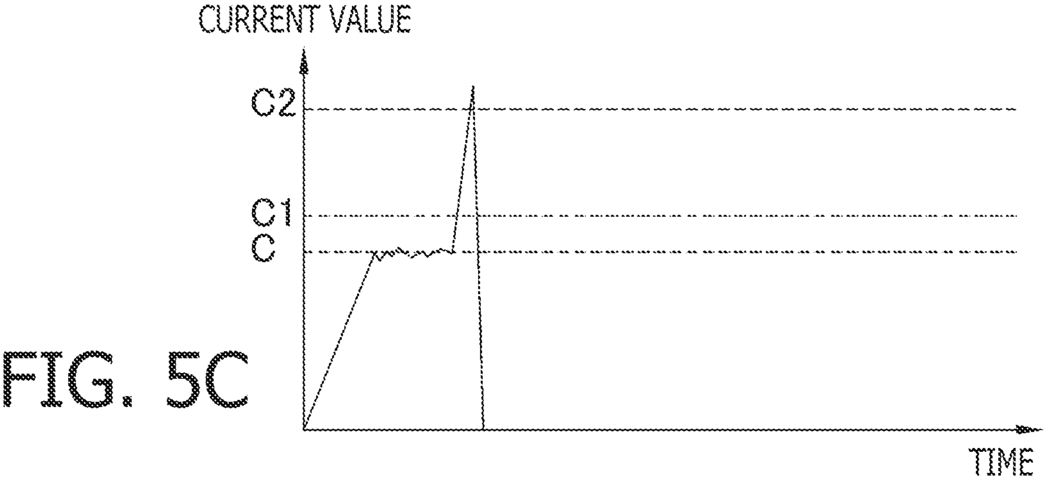
FIG. 5C shows a variation in the current value over time in a situation where the second abnormal state has occurred when the cutter is cutting the roll paper.

Further, there may be another case in which during the period of time from when the rotary blade 52 has passed through the one end of the roll paper Rp until when the rotary blade 52 passes through the other end of the roll paper Rp, the roll paper Rp is not cut by the fixed blade 51 and the rotary blade 52 due to some causes such as deterioration in the paper quality and/or the blades 51 and 52. In such another case, for instance, as shown in FIG. 4C, the roll paper Rp may be bent by being pushed rightward by the rotary blade 52, in such a manner as to disturb the movement of the rotary blade 52, thereby resulting in a second abnormal state where there is an abnormality, different from the first abnormal state, occurring in cutting the roll paper Rp. When the second abnormal state is occurring, as shown in FIG. 5C, the current value exceeds the second threshold C2. It is noted that the second abnormal state may occur as well when a foreign substance that interferes with the movement of the rotary blade 52 is trapped between the carriage 54 and the guide rail 58 or between the fixed blade 51 and the rotary blade 52.

Thus, in the illustrative embodiment, the signal output from the current value output circuit 16 during the cutting of the roll paper Rp varies remarkably depending on the cutting state of the roll paper Rp. In the illustrative embodiment, as will be described below, this feature is used to determine whether there is an abnormality occurring in cutting the roll paper Rp.

The head 6 is disposed between the conveyance roller pair 33 and the conveyance roller pair 34. The head 6 includes a plurality of nozzles (not shown) formed in a lower surface of the head 6, and a driver IC 6*a* (see FIG. 2). The head 6 is configured to, when driver IC 6*a* is driven by the controller 8, eject ink supplied from an ink cartridge (not shown) from the nozzles, thereby forming an image on the sheet P conveyed by the conveyance roller pair 33. The sheet P with the image formed thereon is conveyed frontward (i.e., to the left in FIG. 1) by the conveyance roller pair 34. The head 6 may be any of a line type head to eject ink from the nozzles in a fixed position and a serial type head to eject ink from the nozzles while moving along the left-to-right direction as a main scanning direction.

The discharge tray 7 is configured to receive the sheet P conveyed forward by the conveyance roller pair 34. Examples of the sheet P to be discharged on the discharge tray 7 may include a cut sheet of roll paper Rp, which has a trailing end formed by the cutter 5 and has an image formed thereon by the head 6, and the cut paper Kp with an image formed thereon by the head 6.

The notification device 9 is configured to provide the user with a notification about various types of information. For instance, the notification device 9 may include a display provided to the printer 1. In this case, the notification device 9 may be configured to provide a notification to the user by causing the display to show information to be notified to the user. In another instance, the notification device 9 may further or alternatively include a speaker provided to the printer 1. In this case, the notification device 9 may be configured to provide a notification to the user by causing the speaker to send out information to be notified to the user as a sound.

Next, referring to FIG. 2, the controller 8 to take overall control of the printer 1 will be described. The controller 8 includes a CPU ("CPU" is an abbreviation for "Central Processing Unit") 81, a ROM ("ROM" is an abbreviation for "Read Only Memory") 82, a RAM ("RAM" is an abbreviation for "Random Access Memory") 83, an ASIC ("ASIC" is an abbreviation for "Application Specific Integrated Circuit") 84, and a flash memory 85, which are interconnected via a bus. The controller 8 is configured to control, by the above elements collaborating with each other, operations of the driver IC 6*a*, the feed motor 31M, the conveyance motor 35M, the moving motor 53M, and the notification device 9. The controller 8 is further configured to receive input of the signal indicating the current value from the current value output circuit 16. The controller 8 is further configured to receive input of the signal, indicating the position and the moving speed of the rotary blade 52 (mounted on and moving together with the carriage 54) in the left-to-right direction, from the encoder 17.

The controller 8 may be configured to perform various processes only by the CPU 81, or only by the ASIC 84, or by the CPU 81 and the ASIC 84 collaborating with each other. Further, the controller 8 may include a single CPU 81 configured to perform processing solely, or may include a plurality of CPUs 81 configured to share the processing with each other. Moreover, the controller 8 may include a single ASIC 84 configured to perform processing solely, or may include a plurality of ASICs 81 configured to share the processing with each other. Furthermore, the controller 8 may be configured to perform various processes (including processes as shown in FIGS. 7A-7B, 8, and 10) by one or more CPUs 81 executing programs stored in a non-transitory computer-readable storage medium such as the ROM 82 and the flash memory 85.

Control of Roll Paper Printing

Subsequently, an explanation will be provided of control by the controller 8 when performing roll paper printing to form an image on the roll paper Rp. In the printer 1, the controller 8 performs a process according to a flow shown in FIGS. 7A and 7B in response to receipt of a roll image forming signal for performing the roll paper printing. The roll image forming signal is a signal that instructs the printer 1 to form an image on the roll paper Rp. The roll image forming signal is sent to the controller 8, for instance, from an external device.

Figure 7A:
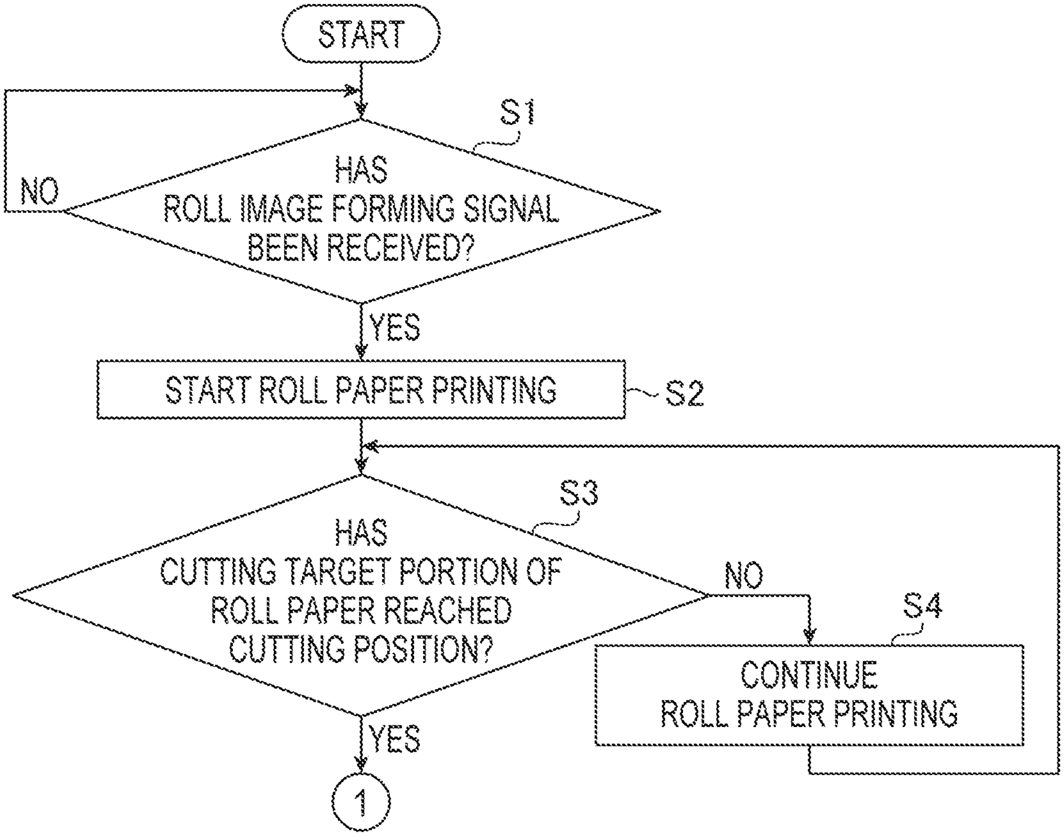
FIGS. 7A and 7B are flowcharts showing an example procedure of a process to be performed by the printer in response to receipt of a roll image forming signal.
Figure 7B:
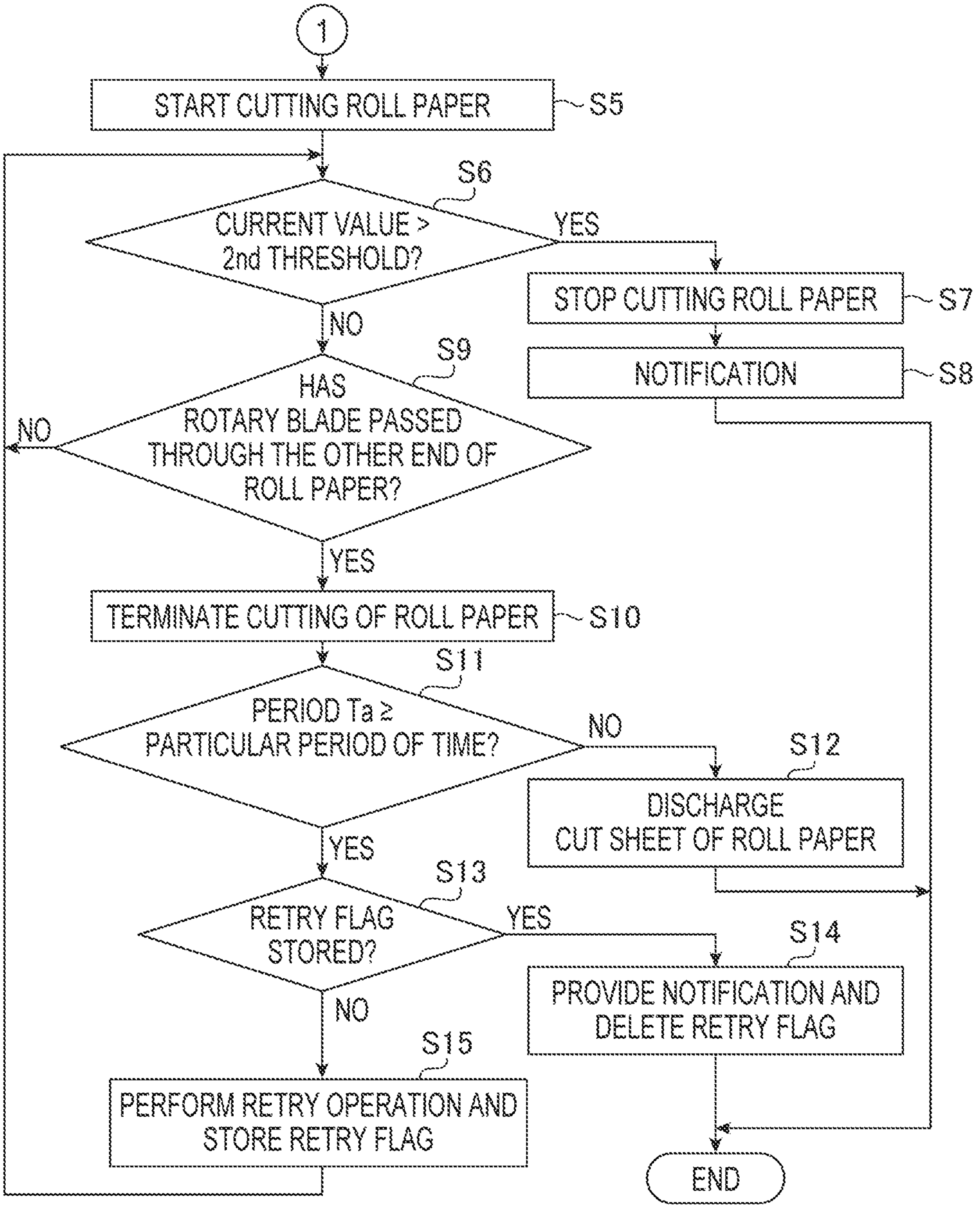

The flow of the process shown in FIGS. 7A and 7B will be described in more detail. The controller 8 first determines whether the roll image forming signal has been received (S1). When determining that the roll image forming signal has not been received (S1: No), the controller 8 repeatedly executes S1. When determining that the roll image forming signal has been received (S1: Yes), the controller 8 starts the roll paper printing (S2). Namely, the controller 8 causes the conveyor 3 to convey the roll paper Rp in the conveyance direction from the feed cassette 2. Then, the controller 8 causes the head 6 to form an image on the roll paper Rp conveyed by the conveyor 3.

Next, the controller 8 determines whether the roll paper Rp has been conveyed until a cutting target portion thereof reaches a cutting position (i.e., an upper end surface of the vertical section 51*a* of the fixed blade 51) of the cutter 5 (S3). The cutting target portion of the roll paper Rp is determined based on the roll image forming signal received by the controller 8. When determining that the roll paper Rp has not been conveyed until the cutting target portion thereof reaches the cutting position of the cutter 5 (S3: No), the controller 8 continues to perform the roll paper printing (S4). Thereafter, the controller 8 goes back to S3. Meanwhile, when determining that the roll paper Rp has been conveyed until the cutting target portion thereof reaches the cutting position of the cutter 5 (S3: Yes), the controller 8 once stops the roll paper printing and starts cutting the roll paper Rp (S5). Namely, the controller 8 drives the moving motor 53M to make a forward rotation, thereby moving the rotary blade 52 from the standby position to the stop position. At this time, the controller 8 stores into the flash memory 85 current value information based on the signal from the current value output circuit 16. Further, at this time, if previous current value information is stored in the flash memory 85, the controller 8 overwrites the previous current value information with the current value information obtained this time. It is noted that the current value information is information regarding the current value varying over time as shown in FIGS. 5A-5C.

Next, based on the signal output from the current value output circuit 16, the controller 8 determines whether the current value during the period of time from the start of cutting the roll paper Rp until the rotary blade 52 passes through the other end (i.e., the end on the stop position) of the roll paper Rp in the left-to-right direction has exceeded the second threshold C2 (S6). When determining that the above current value has exceeded the second threshold C2 (S6: Yes), the controller 8 determines that the second abnormal state is occurring, and stops cutting the roll paper Rp (S7). More specifically, in S7, the controller 8 controls the moving motor 53M in such a manner as to return the rotary blade 52 to the standby position. Afterward, the controller 8 causes the notification device 9 to provide a notification that it is highly likely that the second abnormal state where the rotary blade 52 is obstructed from moving is occurring (S8). Thereafter, the controller 8 terminates the process shown in FIGS. 7A and 7B.

On the other hand, when determining that the above current value has not exceeded the second threshold C2, i.e., the current value is equal to or lower than the second threshold C2 (S6: Yes), the controller 8 determines whether the rotary blade 52 has passed through the other end of the roll paper Rp (S9). When determining that the rotary blade 52 has not passed through the other end of the roll paper Rp (S9: No), the controller 8 goes back to S6. Meanwhile, when determining that the rotary blade 52 has passed through the other end of the roll paper Rp (S9: Yes), the controller 8 controls the moving motor 53M in such a manner as to stop the rotary blade 52 at the stop position, thereby terminating the cutting of the roll paper Rp (S10).

Next, the controller 8 determines whether the period Ta is equal to or longer than a particular period of time, based on the current value information stored in the flash memory 85 (S11). When determining that the period Ta is shorter than the particular period of time (e.g., when the period Ta does not exist, or is extremely short if it exists) (S11: No), the controller 8 determines that the roll paper Rp is in the normal cutting state, and proceeds to S12.

Next, in S12, the controller 8 resumes the once-stopped roll paper printing on the roll paper Rp of which a trailing end has been formed by cutting the roll paper Rp, and then discharges the cut sheet of roll paper Rp on which an image has been formed thereon. At this time, if a retry flag is stored in the flash memory 85, the controller 8 deletes the retry flag. Thereafter, the controller 8 terminates the process shown in FIGS. 7A and 7B.

On the other hand, when determining that the period Ta is equal to or longer than the particular period of time (S11: Yes), the controller 8 determines that the first abnormal state is occurring, and proceeds to S13.

In S13, the controller 8 determines whether the retry flag is stored in the flash memory 85. When determining that the retry flag is stored in the flash memory 85 (S13: Yes), the controller 8 causes the notification device 9 to provide a notification that it is likely that the first abnormal state is occurring (S14). At this time, the controller 8 deletes the retry flag stored in the flash memory 85. Thereafter, the controller 8 terminates the process shown in FIGS. 7A and 7B.

On the other hand, when determining that the retry flag is not stored in the flash memory 85 (S13: No), controller 8 proceeds to S15. In S15, the controller 8 performs a retry operation. The retry operation is an operation of reattempting to cut the roll paper Rp by moving the carriage 54. Specifically, in the illustrative embodiment, the controller 8 controls the moving motor 53M in such a manner as to return the carriage 54 stopped at the stop position in S10 to the standby position and then move the carriage 54 from the standby position to the stop position again. Further, at this time, the controller 8 stores the retry flag in the flash memory 85. Moreover, at this time, the controller 8 overwrites the current value information stored in the flash memory 85 with current value information based on the signal from the current value output circuit 16. Then, the controller 8 returns to S6 and executes S6 and the subsequent steps.

As described above, according to the illustrative embodiment, the printer 1 is configured to, in cutting the roll paper Rp, determine which state the roll paper Rp is in among the normal cutting state, the first abnormal state, and the second abnormal state. Namely, when there is an abnormality occurring in cutting the roll paper Rp, it is possible to determine whether the roll paper Rp is in the first abnormal state or the second abnormal state. Thus, the printer 1 is enabled to perform corresponding operations (e.g., providing the notification in S8 or S14, or retrying to cut the roll paper Rp in S15) depending on the cutting state of the roll paper Rp.

In S6, the controller 8 determines that the second abnormal state is occurring, when the current value exceeds the second threshold C2. Further, in S11, the controller 8 determines that the roll paper Rp is in the normal cutting state when the period Ta is shorter than the particular period of time. Meanwhile, in S11, the controller 8 determines that the first abnormal state is occurring, when the period Ta is equal to or longer than the particular period of time. Thereby, it is possible to determine a moving state of the rotary blade 52 based on the current value corresponding to the load on the moving motor 53M, thereby determining the cutting state of the roll paper Rp.

In S11, the controller 8 determines that the roll paper Rp is in the normal cutting state when the period Ta is shorter than the particular period of time, and that the roll paper Rp is in the first abnormal state when the period Ta is equal to or longer than the particular period of time. Thereby, it is possible to exclude, from the first abnormal state, temporary errors with a very short period of time during which the current value is higher than the first threshold C1 and equal to or lower than the second threshold C2. Therefore, it is possible to more accurately determine whether the first abnormal state is occurring.

When determining in S11 that the first abnormal state is occurring, the controller 8 proceeds via S13 to S15, in which the controller 8 performs the retry operation. Thereby, it is possible to retry to cut the roll paper Rp when the first abnormal state is occurring. Therefore, it is possible to achieve higher reliability for cutting the roll paper Rp.

When determining in S11 that the first abnormal state is occurring, the controller 8 proceeds via S13 to S14, in which the controller 8 causes the notification device 9 to provide the corresponding notification. Thereby, when the first abnormal state is occurring, it is possible to provide the user with the notification that it is highly likely that the roll paper Rp is stuck between the fixed blade 51 and the rotary blade 52.

When determining in S6 that the second abnormal state is occurring, the controller 8 causes the notification device 9 to provide the corresponding notification in S8. Thereby, when the second abnormal state is occurring, it is possible to provide the user with the notification that it is highly likely that the rotary blade 52 is obstructed from moving.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below.

In the aforementioned illustrative embodiment, the first threshold C1 and the second threshold C2 that are previously stored in the flash memory 85 are used as they are to determine the cutting state of the roll paper Rp. However, in a first modification according to aspects of the present disclosure, the first threshold C1 and the second threshold C2 may be changed when one or more particular conditions are satisfied. In this case, the cutting state of the roll paper Rp may be determined using a first threshold D1 and a second threshold D2 that are newly stored in the flash memory 85.

Figure 8:
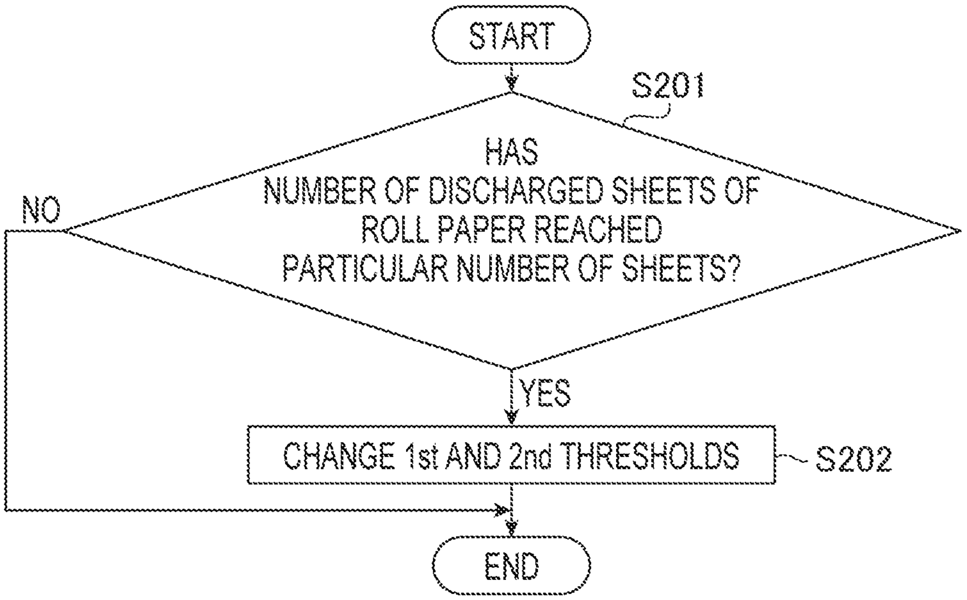
FIG. 8 is a flowchart showing a procedure of a process to be performed by the printer to change a first threshold and a second threshold when a particular condition is satisfied.

In the first modification, as shown in FIG. 8, the controller 8 determines whether the number of sheets discharged after cut from the roll paper Rp by the cutter 5 has reached a particular number of sheets (S201). When determining that the number of sheets discharged after cut from the roll paper Rp by the cutter 5 has not reached the particular number of sheets (S201: No), the controller 8 terminates the process shown in FIG. 8. In the first modification, each time receiving the roll image forming signal, the controller 8 executes S201 and stores into the flash memory 85 the number of sheets discharged after cut from the roll paper Rp by the cutter 5. It is noted that the timing to execute S201 may be changed as needed.

On the other hand, when determining that the number of sheets discharged after cut from the roll paper Rp by the cutter 5 has reached the particular number of sheets (S201: Yes), the controller 8 changes the first threshold C1 and the second threshold C2 that are stored in the flash memory 85 (S202). The fixed blade 51 and the rotary blade 52 become blunter as repeatedly cutting the roll paper Rp. In such a case, even in a state where the roll paper Rp would be cut normally, the current value, which corresponds to the load on the moving motor 53M when the roll paper Rp is being cut, remains higher than the particular value C. Therefore, a value that is several tens of percent higher than the particular value C previously determined through experiments is set as a new particular value D in the normal cutting state. Then, based on this new particular value D, a first threshold D1 and a second threshold D2 are determined. For instance, when the particular value C is 0.6 A, the new particular value D is 0.8 A. In this case, the first threshold D1 is 0.88 A, and the second threshold D2 is 1.2 A. It is noted that the new particular value D, the first threshold D1, and the second threshold D2 may be changed as needed. The first threshold C1 and the second threshold C2 stored in the flash memory 85 are overwritten with the new first threshold D1 and the new second threshold D2 thus determined, respectively. Namely, the first threshold C1 is replaced with the first threshold D1, and the second threshold C2 is replaced with the second threshold D2. After completion of S202, the controller 8 terminates the process shown in FIG. 8. The aforementioned steps S6 and S11 are executed based on the changed first threshold D1 and the changed second threshold D2.

According to the first modification, it is possible to determine the cutting state of the roll paper Rp according to deterioration over time of the fixed blade 51 and the rotary blade 52. In addition, it is possible to determine the cutting state of the roll paper Rp according to the number of sheets discharged after cut from the roll paper Rp by the cutter 5.

In a second modification according to aspects of the present disclosure, the controller 8 may determine in the aforementioned step S201 (see FIG. 8) whether a cumulative printing time of the roll paper Rp has reached a set time. The cumulative printing time represents a time from when the roll paper Rp has started to be conveyed until when the cut sheet of roll paper Rp is discharged. In the second modification, the controller 8 may store in the flash memory 85 a total printing time derived from the conveyance start time at which the roll paper Rp started to be conveyed and the discharge time at which the cut sheet of roll paper Rp was discharged. In this case, when determining that the cumulative printing time of the roll paper Rp has not reached the set time, the controller 8 may terminate the present process (see FIG. 8). Meanwhile, when determining that the cumulative printing time of the roll paper Rp has reached the set time, the controller 8 may change the first threshold C1 to the first threshold D1 and change the second threshold C2 to the second threshold D2 in substantially the same manner as in the aforementioned step S202 (see FIG. 8). Thereafter, the controller 8 may terminate the present process. The second modification produces substantially the same advantageous effects as in the first modification.

In the first and second modifications, the first threshold C1 and the second threshold C2 are changed to the first threshold D1 and the second threshold D2, respectively. However, one of the first threshold C1 and the second threshold C2 may be changed.

In the aforementioned illustrative embodiment, the controller 8 determines the cutting state of the roll paper Rp based on the current value indicated by the signal output from the current value output circuit 16. In a third modification according to aspects of the present disclosure, the controller 8 may determine the cutting state of the roll paper Rp based on the signal output from the encoder 17 that indicates the position and the moving speed of the rotary blade 52. In the third modification, the current value output circuit 16 may not be provided.

Figure 9A:
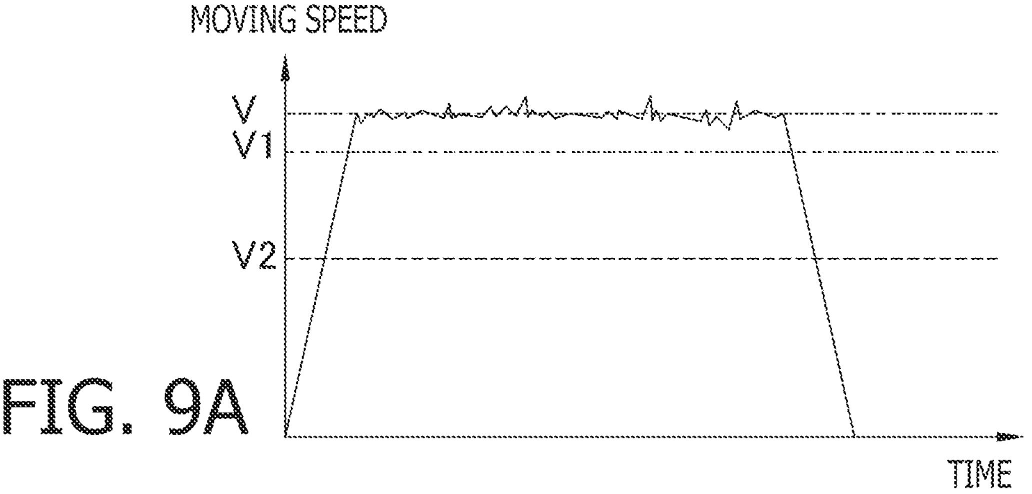
FIG. 9A shows a variation in a moving speed of the rotary blade over time in the situation where the normal cutting state is maintained when the cutter is cutting the roll paper.

In the third modification, when the roll paper Rp has been cut normally by moving the rotary blade 52 from the standby position to the stop position, the encoder 17 outputs a signal indicating the moving speed of the rotary blade 52 that varies as shown in FIG. 9A. When cutting the roll paper Rp, the controller 8 moves the carriage 54 rightward from the standby position and accelerates the carriage 54 until the moving speed reaches a particular speed V. Then, the controller 8 controls the carriage 54 to move at the constant speed after the moving speed of the carriage 54 has reached the particular speed V. In this state, when the roll paper Rp is cut by the fixed blade 51 and the rotary blade 52, the moving load for the rotary blade 52 (i.e., the load on the moving motor 53M in moving the rotary blade 52) appears as a change in the moving speed. Even if there is some variation in the moving speed at this time, the moving speed remains around the particular speed V. Namely, in the normal cutting state where the roll paper Rp is normally cut by the fixed blade 51 and the rotary blade 52, the moving speed remains equal to or higher than a first threshold V1. In the third modification, the first threshold V1 is set to 90% of the particular speed V1. However, the first threshold V1 may be changed as needed as long as the first threshold V1 is set lower than the particular speed V. When the rotary blade 52 passes through the other end of the roll paper Rp, the controller 8 decelerates and stops the carriage 54.

Figure 9B:
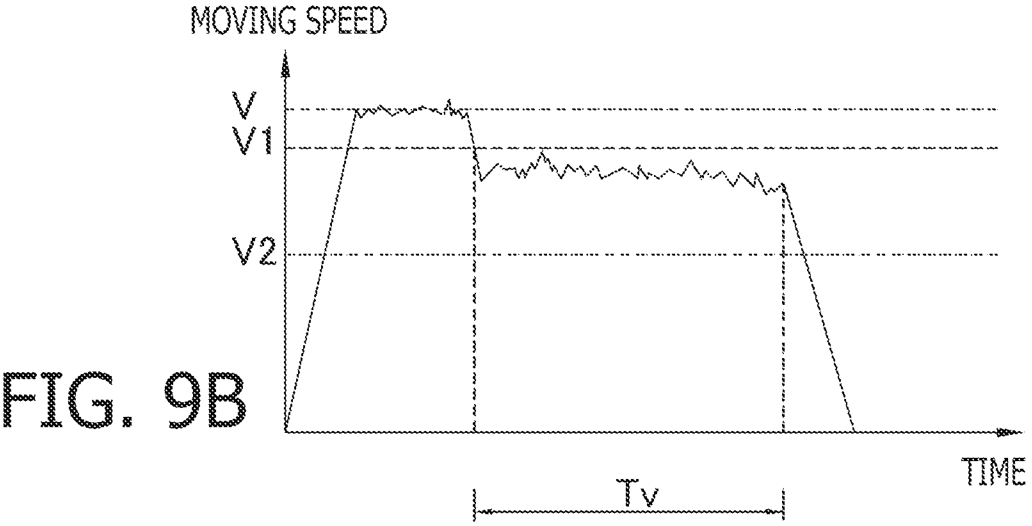
FIG. 9B shows a variation in the moving speed over time in the situation where the first abnormal state has occurred when the cutter is cutting the roll paper.

On the other hand, during a period of time from when the rotary blade 52 has passed through the one end of the roll paper Rp until when the rotary blade 52 passes through the other end of the roll paper Rp, the aforementioned first abnormal state may occur. When the first abnormal state is occurring, as shown in FIG. 9B, a period Tv arises during which the moving speed is lower than the first threshold V1 and is equal to or higher than a second threshold V2. In the third modification, the second threshold V2 is set to 50% of the particular speed V. However, the second threshold V2 may be changed as needed as long as the second threshold V2 is set lower than the first threshold V1.

Figure 9C:
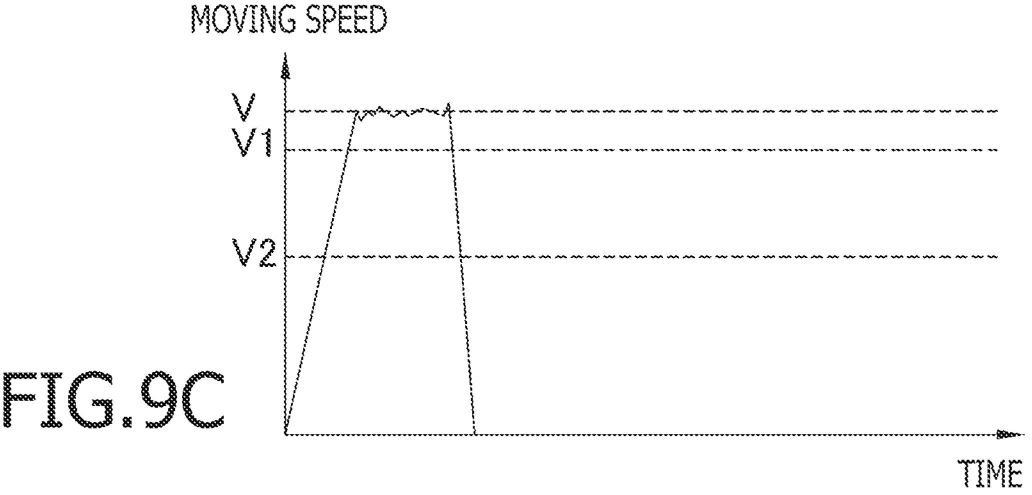
FIG. 9C shows a variation in the moving speed over time in the situation where the second abnormal state has occurred when the cutter is cutting the roll paper.

Further, the aforementioned second abnormal state may occur during the period of time until the rotary blade 52 passes through the other end of the roll paper Rp. When the second abnormal state is occurring, as shown in FIG. 9C, the moving speed becomes lower than the second threshold V2.

Thus, in the third modification, the signal output from the encoder 17 during the cutting of the roll paper Rp varies remarkably depending on the cutting state of the roll paper Rp. In the third modification, as will be described below, this feature is used to determine whether there is an abnormality occurring in cutting the roll paper Rp.

Control of Roll Paper Printing

Subsequently, an explanation will be provided of control by the controller 8 when performing roll paper printing to form an image on the roll paper Rp in the third modification. In the printer 1, the controller 8 performs a process according to a flow shown in FIG. 10 in response to receipt of a roll image forming signal for performing the roll paper printing.

Figure 10:
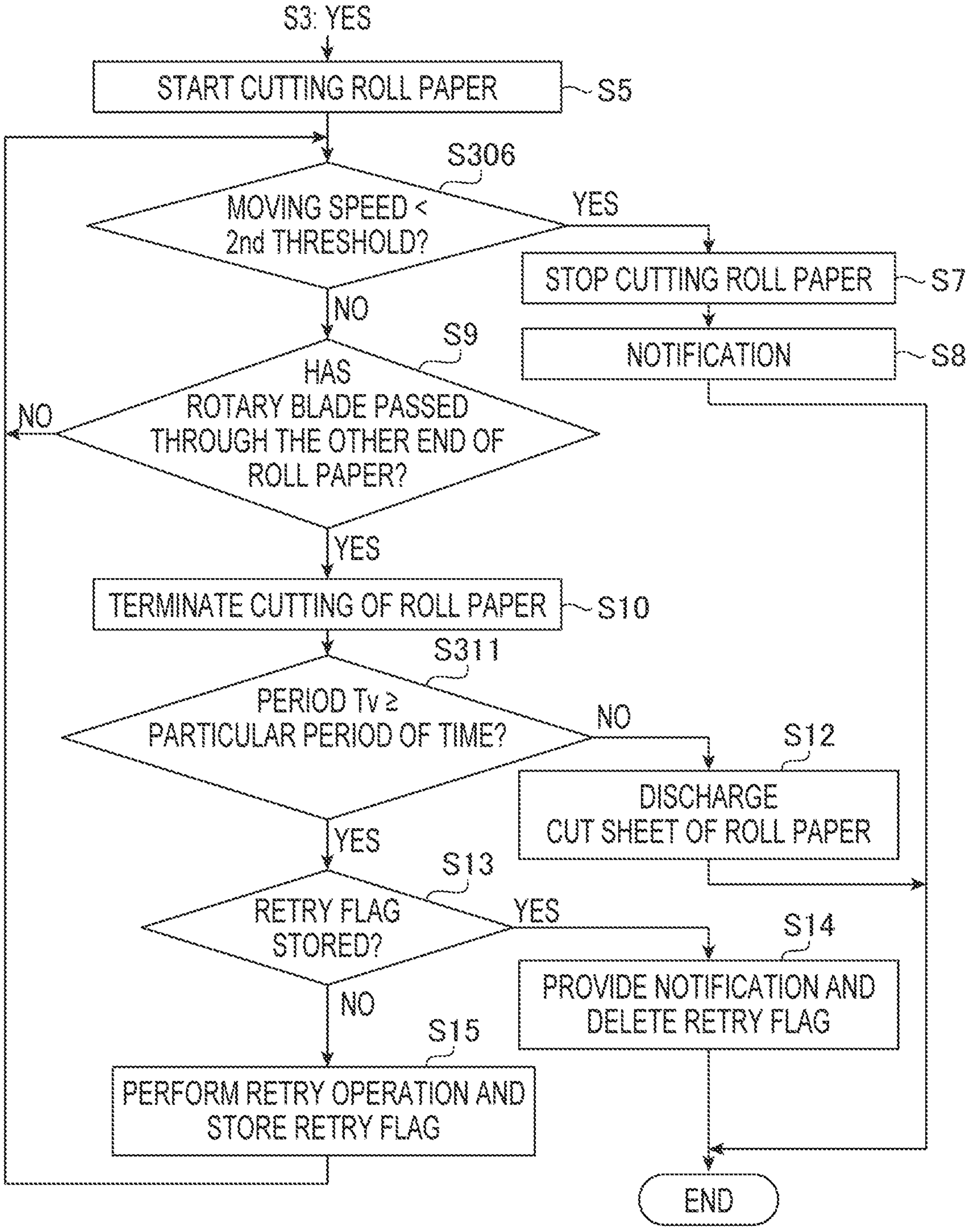
FIG. 10 is a flowchart showing a partial procedure of a process to be performed by the printer in response to receipt of the roll image forming signal.

The flow of the process shown in FIG. 10 will be described in more detail. When proceeding to S3-S5 after execution of the aforementioned steps S1-S4, the controller 8 once stops the roll paper printing and starts cutting the roll paper Rp, in substantially the same manner as described above. Namely, the controller 8 drives the moving motor 53M to make a forward rotation, thereby moving the rotary blade 52 from the standby position to the stop position. At this time, the controller 8 stores into the flash memory 85 moving speed information based on the signal from the encoder 17. Further, at this time, if previous moving speed information is stored in the flash memory 85, the controller 8 overwrites the previous moving speed information with the moving speed information obtained this time. It is noted that the moving speed information is information regarding the moving speed (of the rotary blade 52 mounted on the carriage 54) varying over time as shown in FIGS. 9A-9C.

Next, based on the signal output from the encoder 17, the controller 8 determines whether the moving speed during the period of time from the start of cutting the roll paper Rp until the rotary blade 52 passes through the other end (i.e., the end on the stop position) of the roll paper Rp in the left-to-right direction has become lower than the second threshold V2 (S306). When determining that the moving speed has become lower than the second threshold V2 (S306: Yes), the controller 8 determines that the second abnormal state is occurring, and stops cutting the roll paper Rp (S7). Afterward, the controller 8 causes the notification device 9 to provide the notification that it is highly likely that the second abnormal state where the rotary blade 52 is obstructed from moving is occurring (S8). Thereafter, the controller 8 terminates the process shown in FIG. 10.

On the other hand, when determining that the moving speed has not become lower than the second threshold V2, i.e., the moving speed is equal to or higher than the second threshold V2 (S306: No), the controller 8 executes the aforementioned steps S9 and S10.

Next, the controller 8 determines whether the period Tv is equal to or longer than a particular period of time, based on the moving speed information stored in the flash memory 85 (S311). When determining that the period Tv is shorter than the particular period of time (e.g., when the period Tv does not exist, or is extremely short if it exists) (S311: No), the controller 8 determines that the roll paper Rp is in the normal cutting state, and proceeds to the aforementioned step S12. After completion of S12, the controller 8 terminates the process shown in FIG. 10.

On the other hand, when determining that the period Tv is equal to or longer than the particular period of time (S311: Yes), the controller 8 determines that the first abnormal state is occurring, and proceeds to the aforementioned step S13. Depending on the determination in S13, the controller 8 proceeds to the aforementioned step S14 or S15, in which the controller 8 performs substantially the same process as described above.

As described above, in the third modification as well, the printer 1 is configured to, in cutting the roll paper Rp, determine which state the roll paper Rp is in among the normal cutting state, the first abnormal state, and the second abnormal state, in substantially the same manner as in the aforementioned illustrative embodiment. Thus, the printer 1 is enabled to perform corresponding operations (e.g., providing the notification in S8 or S14, or retrying to cut the roll paper Rp in S15) depending on the cutting state of the roll paper Rp. Moreover, in S306, the controller 8 determines that the second abnormal state is occurring when the moving speed becomes lower than the second threshold V2. In S311, the controller 8 determines that the roll paper Rp is in the normal cutting state when the period Tv is shorter than the particular period of time. In S311, the controller 8 determines that the first abnormal state is occurring when the period Tv is equal to or longer than the particular period of time.

In the third modification, the aforementioned first and second modifications may be applied. Namely, the first and second thresholds V1 and V2 may be changed when one or more particular conditions are satisfied (e.g., when the number of sheets discharged after cut from the roll paper Rp by the cutter 5 has reached a particular number of sheets, or the cumulative printing time has reached a particular time). In this case, the cutting state of the roll paper Rp may be determined using a first threshold and a second threshold that are newly stored. In this case, substantially the same advantageous effects are produced.

Only the exemplary illustrative embodiment according to aspects of the present disclosure and the modifications of its versatility have been shown and described. It is to be understood that aspects of the present disclosure are capable of use in various other combinations and environments and are capable of changes or modifications within the scope of the technical concepts as expressed herein. In the aforementioned illustrative embodiment, there may be a case where when making the affirmative determination in S11 (S11: Yes), the controller 8 proceeds to S15 via S13. However, for instance, when making the affirmative determination in S11 (S11: Yes), the controller 8 may proceed directly to S14. Namely, in this case, S13 and S15 may be omitted. In another instance, S8 and S14 may be omitted. In this case, the notification device 9 may not be provided.

In the aforementioned illustrative embodiment and the modifications, the cutter 5 has the fixed blade 51. However, for instance, the cutter 5 may have, instead of the fixed blade 51, a rotatable blade that is movable along the left-to-right direction together with the rotary blade 52. It is noted that such an alternative blade instead of the fixed blade 51 may not necessarily be rotatable. Namely, the alternative blade may be a non-rotatable blade. The fixed blade 51 and the rotary blade 52 may be interchanged in the front-to-rear direction. Namely, the fixed blade 51 may be disposed rearward of the rotary blade 52.

Aspects of the present disclosure may be applied not only to inkjet printers, but also to electrophotographic printers that have a laser-type print engine configured to form an electrostatic latent image by exposing a photoconductive body with a laser, or an LED-type print engine configured to form an electrostatic latent image by exposing a photoconductive body with an LED. The sheet medium is not limited to paper, but may be cloth or other media as long as it is formed in a sheet shape.

The following shows examples of associations between elements illustrated in the aforementioned illustrative embodiment and modifications, and elements claimed according to aspects of the present disclosure. For instance, the printer 1 may be an example of an "image forming apparatus" according to aspects of the present disclosure. The conveyor 3 may be an example of a "conveyor" according to aspects of the present disclosure. The head 6 may be included in a "print engine" according to aspects of the present disclosure. The cutter 5 may be an example of a "cutter" according to aspects of the present disclosure. The fixed blade 51 and the rotary blade 52 may be included in examples of a "first blade" according to aspects of the present disclosure, and may be included in examples of a "second blade" according to aspects of the present disclosure. The moving mechanism 53 may be an example of a "moving device" according to aspects of the present disclosure. The current value output circuit 16 and the encoder 17 may be included in examples of a "signal output device" according to aspects of the present disclosure. The controller 8 may be an example of a "controller" according to aspects of the present disclosure. The moving motor 53M may be an example of a "motor" according to aspects of the present disclosure. The notification device 9 may be an example of a "notification device" according to aspects of the present disclosure. The CPU 81 may be an example of a "processor" according to aspects of the present disclosure. The ROM 82 and the flash memory 85 may be included in examples of a "non-transitory computer-readable storage medium" according to aspects of the present disclosure. The normal cutting state may be an example of a "first state" according to aspects of the present disclosure. The first abnormal state may be an example of a "second state" according to aspects of the present disclosure. The second abnormal state may be an example of a "third state" according to aspects of the present disclosure.

What is claimed is:

1. An image forming apparatus comprising:

a conveyor configured to convey a sheet medium in a conveyance direction;

a print engine configured to form an image on the sheet medium conveyed by the conveyor;

a cutter comprising:

a first blade configured to come into contact with a first surface of the sheet medium conveyed by the conveyor;

a second blade configured to come into contact with a second surface opposite to the first surface, of the sheet medium; and a moving device configured to move at least one blade, selected from the first blade and the second blade, along an intersecting direction with the conveyance direction, the cutter being configured to cut the sheet medium along the intersecting direction by the first blade and the second blade collaborating with each other;

a signal output device configured to output a signal indicating a variation over time in a value correlated with a moving load for the at least one blade in cutting the sheet medium by the cutter; and a controller configured to, based on the signal output from the signal output device during the cutting of the sheet medium, determine which state the sheet medium is in among a plurality of states including:

a first state where the sheet medium is cut normally, the first state being identified in association with a first pattern of variation over time of the signal output from the signal output device;

a second state where there is an abnormality occurring in cutting the sheet medium, the second state being identified in association with a second pattern of variation over time of the signal output from the signal output device; and a third state where there is an abnormality, different from the second state, occurring in cutting the sheet medium, the third state being identified in association with a third pattern of variation over time of the signal output from the signal output device, the first pattern, the second pattern and the third pattern being different from each other and classified by comparisons using two different signal level thresholds.

2. The image forming apparatus according to claim 1, wherein the moving device comprises a motor configured to provide a driving force to move the at least one blade, wherein the signal output device is further configured to output the signal indicating a variation over time in a current value of an electric current applied to the motor in moving the at least one blade, and wherein the controller is further configured to:

determine that the sheet medium is in the first state when the current value remains equal to or lower than a first threshold throughout the cutting of the sheet medium;

determine that the sheet medium is in the second state when there is an abnormal period during which the current value is higher than the first threshold and equal to or lower than a second threshold above the first threshold, and the current value remains equal to or lower than the second threshold throughout the cutting of the sheet medium; and determine that the sheet medium is in the third state when the current value becomes higher than the second threshold during the cutting of the sheet medium.

3. The image forming apparatus according to claim 2, wherein the controller is further configured to:

determine that the sheet medium is in the second state when the abnormal period is equal to or longer than a particular period of time; and determine that the sheet medium is in the first state when the abnormal period is shorter than the particular period of time.

4. The image forming apparatus according to claim 2, wherein the controller is further configured to change at least one threshold selected from the first threshold and the second threshold, when a particular condition, indicating deterioration over time of the at least one blade, is satisfied.

5. The image forming apparatus according to claim 4, wherein the particular condition includes that a count of sheets cut from the sheet medium by the cutter reaches a particular number of sheets.

6. The image forming apparatus according to claim 4, wherein the particular condition includes that a cumulative printing time reaches a set time, the cumulative printing time representing a time from when the sheet medium has started to be conveyed by the conveyor until when a sheet cut from the sheet medium by the cutter is discharged.

7. The image forming apparatus according to claim 1, wherein the signal output device is further configured to output the signal indicating a position and a moving speed of the at least one blade during the cutting of the sheet medium, and wherein the controller is further configured to:

determine that the sheet medium is in the first state when the moving speed remains equal to or higher than a first threshold throughout the cutting of the sheet medium from when the at least one blade has passed through a first end of the sheet medium in the intersecting direction until when the at least one blade passes through a second end different from the first end, of the sheet medium in the intersecting direction;

determine that the sheet medium is in the second state when there is an abnormal period during which the moving speed when the at least one blade is passing the sheet medium is lower than the first threshold and equal to or higher than a second threshold below the first threshold, and the moving speed remains equal to or higher than the second threshold throughout the cutting of the sheet medium from when the at least one blade has passed through the first end of the sheet medium in the intersecting direction until when the at least one blade passes through the second end of the sheet medium in the intersecting direction; and determine that the sheet medium is in the third state when the moving speed becomes lower than the second threshold during the cutting of the sheet medium from when the at least one blade has passed through the first end of the sheet medium in the intersecting direction until when the at least one blade passes through the second end of the sheet medium in the intersecting direction.

8. The image forming apparatus according to claim 7, wherein the controller is further configured to:

determine that the sheet medium is in the second state when the abnormal period is equal to or longer than a particular period of time; and determine that the sheet medium is in the first state when the abnormal period is shorter than the particular period of time.

9. The image forming apparatus according to claim 7, wherein the controller is further configured to change at least one threshold selected from the first threshold and the second threshold, when a particular condition, indicating deterioration over time of the at least one blade, is satisfied.

10. The image forming apparatus according to claim 9, wherein the particular condition includes that a count of sheets cut from the sheet medium by the cutter reaches a particular number of sheets.

11. The image forming apparatus according to claim 9, wherein the particular condition includes that a cumulative printing time reaches a set time, the cumulative printing time representing a time from when the sheet medium has started to be conveyed by the conveyor until when a sheet cut from the sheet medium by the cutter is discharged.

12. The image forming apparatus according to claim 1, wherein the controller is further configured to, when determining that the sheet medium is in the second state, reattempt to cut the sheet medium by the cutter.

13. The image forming apparatus according to claim 1, further comprising a notification device configured to provide a notification to a user, wherein the controller is further configured to, when determining that the sheet medium is in the second state, cause the notification device to provide a notification that it is highly likely that the sheet medium is stuck between the first blade and the second blade.

14. The image forming apparatus according to claim 1, further comprising a notification device configured to provide a notification to a user, wherein the controller is further configured to, when determining that the sheet medium is in the third state, cause the notification device to provide a notification that it is highly likely that the at least one blade is obstructed from moving.

15. The image forming apparatus according to claim 1, wherein the controller comprises:

a processor; and a non-transitory computer-readable storage medium storing computer-readable instructions configured to, when executed by the processor, cause the controller to, based on the signal output from the signal output device during the cutting of the sheet medium, determine which state the sheet medium is in among the plurality of states including the first state, the second state, and the third state.

16. A method implementable on a controller of an image forming apparatus configured to cut a sheet medium by moving at least one blade of a cutter, the method comprising:

receiving, from a signal output device, a signal indicating a variation over time in a value correlated with a moving load for the at least one blade in cutting the sheet medium; and based on the signal output from the signal output device during the cutting of the sheet medium, determining which state the sheet medium is in among a plurality of states including:

a first state where the sheet medium is cut normally, the first state being identified in association with a first pattern of variation over time of the signal output from the signal output device;

a second state where there is an abnormality occurring in cutting the sheet medium, the second state being identified in association with a second pattern of variation over time of the signal output from the signal output device; and a third state where there is an abnormality, different from the second state, occurring in cutting the sheet medium, the third state being identified in association with a third pattern of variation over time of the signal output from the signal output device, the first pattern, the second pattern and the third pattern being different from each other and classified by comparisons using two different signal level thresholds, wherein the image forming apparatus comprises:

a conveyor configured to convey the sheet medium in a conveyance direction;

a print engine configured to form an image on the sheet medium conveyed by the conveyor;

the cutter comprising:

a first blade configured to come into contact with a first surface of the sheet medium conveyed by the conveyor;

a second blade configured to come into contact with a second surface opposite to the first surface, of the sheet medium; and a moving device configured to move the at least one blade, selected from the first blade and the second blade, along an intersecting direction with the conveyance direction, the cutter being configured to cut the sheet medium along the intersecting direction by the first blade and the second blade collaborating with each other;

the signal output device; and the controller.

17. The method according to claim 16, wherein the moving device comprises a motor configured to provide a driving force to move the at least one blade, wherein the signal output device is configured to output the signal indicating a variation over time in a current value of an electric current applied to the motor in moving the at least one blade, and wherein the method further comprises:

determining that the sheet medium is in the first state when the current value remains equal to or lower than a first threshold throughout the cutting of the sheet medium;

determining that the sheet medium is in the second state when there is an abnormal period during which the current value is higher than the first threshold and equal to or lower than a second threshold above the first threshold, and the current value remains equal to or lower than the second threshold throughout the cutting of the sheet medium; and determining that the sheet medium is in the third state when the current value becomes higher than the second threshold during the cutting of the sheet medium.

18. The method according to claim 16, wherein the signal output device is configured to output the signal indicating a position and a moving speed of the at least one blade during the cutting of the sheet medium, and wherein the method further comprises:

determining that the sheet medium is in the first state when the moving speed remains equal to or higher than a first threshold throughout the cutting of the sheet medium from when the at least one blade has passed through a first end of the sheet medium in the intersecting direction until when the at least one blade passes through a second end different from the first end, of the sheet medium in the intersecting direction;

determining that the sheet medium is in the second state when there is an abnormal period during which the moving speed when the at least one blade is passing the sheet medium is lower than the first threshold and equal to or higher than a second threshold below the first threshold, and the moving speed remains equal to or higher than the second threshold throughout the cutting of the sheet medium from when the at least one blade has passed through the first end of the sheet medium in the intersecting direction until when the at least one blade passes through the second end of the sheet medium in the intersecting direction; and determining that the sheet medium is in the third state when the moving speed becomes lower than the second threshold during the cutting of the sheet medium from when the at least one blade has passed through the first end of the sheet medium in the intersecting direction until when the at least one blade passes through the second end of the sheet medium in the intersecting direction.

* * * * *